Jan. 18, 1938. H. BECKER 2,105,628

FILM LOADING CASETTE

Filed Nov. 5, 1935

Helmut Becker
INVENTOR

BY Ivan E. A. Konigsberg
ATTORNEY

Patented Jan. 18, 1938

2,105,628

UNITED STATES PATENT OFFICE 2,105,628

FILM LOADING CASETTE

Helmut Becker, Wetzlar, Germany, assignor to Ernst Leitz, G. m. b. H., Wetzlar, Germany Application November 5, 1935, Serial No. 48,273
In Germany December 13, 1934

1 Claim. (Cl. 88—17)

This invention relates to improvements in film loading casettes of the type which are used for loading film cameras by placing the casette inside the camera with a portion of the film projecting from the casette in engagement with the camera film operating rollers. The object of the invention is to provide a film loading casette for the purpose set forth characterized by that the casette is provided with means for forming the film into a special loop outside the casette in which looped position the film is held by special holding means. These latter are released when the casette has been placed in the camera and the loop of the film is in a position to automatically engage the camera film rollers for which purpose the film loop is so formed that upon the release thereof the film engages the camera rollers because of its natural coiling tendency. A casette embodying the features of the invention is particularly well adapted for the loading of small hand cameras or miniature film cameras. In the accompanying drawing Fig. 1 is a side view of the film loading casette with parts in section and parts removed.

Figure 1:
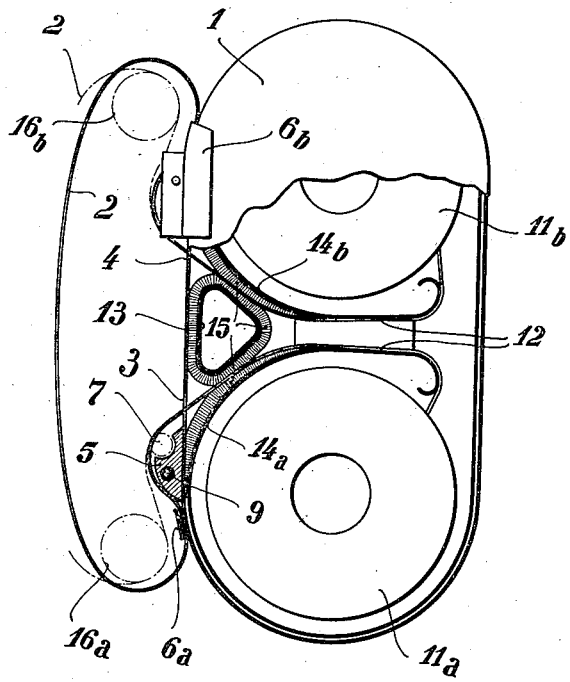
Figure 2:
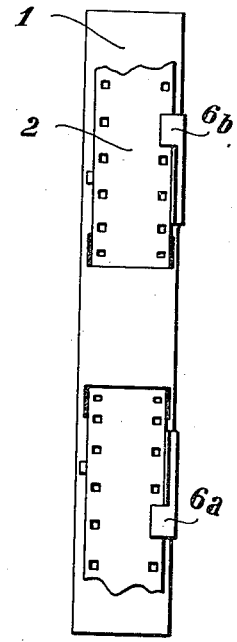
Fig. 2 is a view of the front wall of the casette.

Referring to the drawing the reference character 1 denotes a film casette having a film unwinding roller 11a and a film winding-up roller 11b. The film 2 is initially wound upon the roller 11a from which it is drawn outside the casette to form a loop and then returned to the casette to be wound up upon the roller 11b. The path of the film within the casette is from the roller 11a, over a guide 12 to the outside through a film outlet 3, then back through a film inlet 4, over another film guide 12 and to the roller 11b. Suitable light excluding means such as plush or velvet linings 15 are provided on the film guides adjacent the openings 3 and 4.

It is a feature of this invention that the film is formed into a special loop before it is placed in position to engage the film driving rollers in the camera. For this purpose therefore the casette is provided in or upon its front wall with bearings 5 located adjacent the film openings, one near each opening and preferably shaped so as to provide projections over which the film may conveniently glide in its passage from the casette to the camera and return. In each of the bearings 5 there is slidably supported a pin 9 which on its outer end, uppermost in Figure 3, carries a right angled bent film holder or clip 6a, 6b, respectively. The holders are arranged to engage the film as shown and hold it against the wall of the casette. The clip, as is obvious from the drawing, at the same time limits the inward movement of the pin urged by a spring 8 in that one leg of the clip takes against the side of the casette.

The camera is indicated in Figure 1 by its two film driving rollers 16a and 16b as well as by one of the usual film guiding rollers 7. When the camera is to be loaded the film is formed into a loop as shown in Figure 1 by drawing the film out through the opening 3 and then bending it over the bearing 5 and under the clip 6a. Then the loop is formed and the film returned to the casette by again passing it under the other clip 6b and in through the opening 4 to the roller 11b. The casette with the film loop is then placed within the camera with the film looped over the camera rollers 16a and 16b as shown in Figure 1. This operation is facilitated by providing the bearings with a recess to be engaged by the guiding rollers 7, only one of which is shown. This construction obviously assists in positioning the casette.

Figure 3:
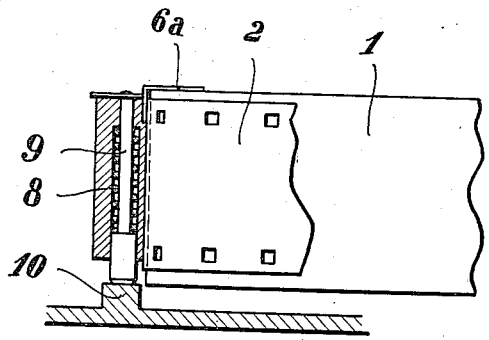
Fig. 3 is a detail view showing the film holding and releasing means.

The camera bottom is provided with lugs 10, see Figure 3, in alinement with the pins 9 of the casette when the latter is placed within the camera. As the operator completes the insertion of the casette, the pins 9 are engaged by the lugs 10 whereby they are pushed outwardly and whereby the film is automatically released from the holding clips 6a and 6b. The film loop then automatically engages the rollers 16a and 16b in the camera because of its natural coiling tendency and the camera is then ready for operation. The film is free to be driven by the rollers 16a and 16b so long as the casette remains in the camera. If for any reason the casette is removed, the film clips 6a and 6b will immediately and automatically reengage the film to hold it as aforesaid. The position, size and shape of the bearings 5 depend of course upon the position of the camera driving rollers in the camera. Preferably the bearings 5 are so arranged that they project across the common tangent for the two camera rollers as shown because such a construction facilitates the placing of the film with respect to said rollers as is obvious. There may be camera constructions which do not permit of the casette having projecting bearings in which case of course the bearings 5 may be eliminated and the pins 9 located closer to the casette wall or entirely within the casette. Such modified construction is within the skill of the person acquainted with the art. Other modifications and changes may be made without departing from the principle of the invention and the scope of the appended claim.

I claim:—

A film loading casette comprising a casing containing the film and having openings for withdrawing and inserting the leading end of the film, curved projections on said casing adjacent the said openings, said film being formed into a loop outside the casette between the said openings for automatic engagement with the film driving means of a camera which is to be loaded with the film, portions of the film being drawn around said projections in forming the loop, holders on the casette adjacent the said curved portions for automatically engaging the film to hold it in its loop formation and against the said projections and means secured to the holders operable by contact with the camera for automatically releasing the film when the casette is placed in operative position within the camera.

HELMUT BECKER.